United States Patent Office 3,342,669
Patented Sept. 19, 1967

3,342,669
STEREOTYPE MAT CONTAINING A PHOSPHATE PIGMENT AND SILICATE PIGMENT
Winfred Doyle Boggess, Indianapolis, Ind., assignor to The Beveridge Paper Company, Indianapolis, Ind., a corporation of Indiana
No Drawing. Filed June 10, 1964, Ser. No. 374,166
3 Claims. (Cl. 162—181)

This invention relates to novel stereotype mats with improved shrinkage properties. In addition, this invention relates to novel pigment compositions for use in preparing stereotype mats with improved qualities.

Stereotype mats are of two types, wet and dry. Dry stereotype mats, with which this invention is concerned, are sheets of co-felted cellulose fibers containing a filler or pigment. The mats are prepared by mixing the pigment into an aqueous slurry of the fibers in a paper making machine. Useful cellulose fibers include rag stocks, wood fibers, cotton linters, and the like. The mixture is then felted upon the screen of the paper machine so as to form a web, and the web is transferred to a moving endless belt and thence to a revolving roll upon which the web is wound until it is built up to form a mat of the desired thickness, usually from .015 to .080 inch, after partial drying. During the partial drying step, one surface of the mat, the surface which is to receive the impression of the printing form is calendered so as to remove any projecting fibers and the reverse side is kept against a porous surface such as a woven fabric belt. The surface of the mat which is to receive the impression of the printing form may also be coated to insure that the aforesaid impression will be as smooth and uniform as possible.

When the stereotype mat is partially dried, it still can contain moisture in the range of from 10% to 50% of the weight of cellulose fibers plus pigment. The reverse side of the mat is kept porous and irregular, compared to the side which is to receive the impression, so that when the remainder of the moisture is driven out of the mat in a "scorcher," this moisture may escape readily without rupture of the mat.

In general, pigment is added to the cellulose fibers in order to decrease the density of the mat and to render the surfaces of the mat, particularly that surface which is to receive the impression of the printing form, smoother. The lower density of the mat, which is usually expressed in terms of the bulking value or weight in pounds of the mat per 1,000 square feet .001 inch thick, is highly desirable, inasmuch as the lower the density of the mat, the greater the impression produced per pound of applied pressure and, the greater the impression, the better the printing plate produced using the impressed mat as a mold. Thus, there is a premium on compressibility or moldability of the stereotype mat. On the other hand, the greater bulking produced by the use of pigments with the cellulose fibers, the lesser the shrinkage of the stereotype mat. Newspaper stereotypers, for example, want shrinkage to be a maximum in forming their molds with the use of stereotype mats, and thus, high bulk mats are not desirable in the printing of newspapers. It is believed that the decreased shrinkage occasioned by the use of pigment is caused by the fact that the pigment particles are usually amorphous and of extremely small size, of the order of .02 to .5 micron. In fact, these particles are so small that they can interpose themselves between the usual elongated fibers and prevent the interaction or bonding of the fibers in a more or less mechanical, as opposed to chemical, fashion, which interaction is the normal cause of shrinkage. Various pigments which have been employed in the past which increase the bulking value of the stereotype mat while decreasing the shrinkage include natural clays, "synthetic" alkaline earth silicates, such as those disclosed in U.S. Patent 2,739,068, "synthetic" hydrous oxides of silicon, aluminum and chromium, such as disclosed in U.S. Patent 2,825,645 and "synthetic" inorganic gel zeolites containing aluminum plus another metal. The term "synthetic" indicates that the pigment has been prepared by precipitation in the laboratory, usually under conditions in which amorphous product is formed, as opposed to a naturally occurring mineral.

It is an object of this invention to prepare a stereotype mat having both desirable bulking and shrinkage properties. It is also an object of this invention to provide novel stereotype mats free from the major defects of past stereotype mats. Other objects of this invention will become apparent from the description which follows. It is a still further object of this invention to provide a novel pigment for a stereotype mat.

In fulfillment of the above and other objects, this invention provides an otherwise standard stereotype mat in which the pigment or filler employed is a mixture of calcium aluminum phosphate and a second pigment selected from the group consisting of calcium silicate, hydrous silicon oxide and a double silicate of an alkali metal and an amphoteric metal (also referred to as a gel zeolite). This novel pigment combination can contain from 20% to 60% of calcium aluminum phosphate and from 80% to 40% of calcium silicate or hydrous silicon oxide or a gel zeolite. As with other pigments useful in preparing low density stereotype mats, the pigment particle size is critical and should be below about 0.5 micron or alternatively, should have a surface area of at least 10 square meters per gram. Such particle sizes are, of course, more readily attained by precipitation of the pigment in a substantially amorphous state followed by micropulverization than by attempting to pulverize naturally occurring crystalline material. A preferred calcium aluminum phosphate for use in preparing my novel stereotype mats has upwards of 80% of the particles below about 1 micron in size and 99% below about 2 microns with an average size of about .3 micron. The second pigment of my novel pigment combination can usually be obtained in even smaller particle size than calcium aluminum phosphate. Calcium silicates useful in making my novel stereotype mats, for example, have a surface area in the range of 40–150 square meters per gram, with average particle sizes in the range 0.02–0.03 micron. Hydrated silicon oxides and gel zeolites useful in making my novel stereotype mats have comparable particle sizes and surface areas.

An eminently suitable method of preparing amorphous calcium aluminum phosphate for use in my novel process is set forth in U.S. Patent 2,974,054 particularly Examples. 1–4. A typical batch of "synthetic" calcium aluminum phosphate thus produced has a surface area of about 220 square meters per gram, a specific gravity in the range 2.3–2.4 and an average particle size of 0.3 micron. "Synthetic" calcium silicate, one of the second group of pigments useful as ingredients in combination with calcium aluminum phosphate in my novel filler compositions, is prepared according to the procedure set forth in U.S. Patent 2,739,068, particularly Example 1. The specific surface area of this pigment is about 45 square meters per gram. Hydrous silicon oxide for use in my novel pigment combinations can best be prepared according to the procedures set forth in U.S. Patent 2,825,645 particularly by the procedures of Examples 1 and 2. Novel gel zeolites or double silicates of an alkali metal and an amphoteric metal for use in my novel pigment combinations can be prepared by the procedures outlined in U.S. Patent 2,918,399. These gel zeolites include such double silicates as sodium aluminum silicate, sodium zinc silicate, potassium iron silicate, sodium manganese silicate and the like as well as double silicates of chromium molybdenum and other similar amphoteric metals.

The chief advantage of my novel combination of pigments for use as a filler in stereotype mats is the fact that there is considerable less loss of shrinkage than has hitherto been experienced with high bulking value pigments. In other words, the shrinkage of stereotype mats prepared with my novel pigment combination is greater than that expected with equal amounts of the prior art pigments, particularly when either or "synthetic" hydrated silicon oxide or a synthetic zeolite which the second pigments used in novel invention, is used alone. This result is most unexpected since it has been the invariable rule in the past that the higher the bulking value of the pigment and the lower the density of the resulting stereotype mat, the lower the shrinkage. The cause of the reversal of the shrinkage effect is presumably due to the fact that one of the ingredients in my novel pigment composition is a phosphate whereas the prior art pigments were usually silicates.

In preparing stereotype mats utilizing the novel pigment combination of this invention, the cellulose fibers, which can be wood fibers, cotton liners, rag stocks or the like, are slurried in water in a beating machine and the pigment is added to the cellulose fiber slurry, usually at the rate of 10 lbs. to 40 lbs. of pigment per 100 lbs. of dry weight of fiber. The resulting mixture is converted into a stereotype mat according to the conventional process outlined previously.

Stereotype mats prepared with the novel pigment combinations of this invention also possess all the usual advantages associated with the use of low particle size pigments or fillers such as greater compressibility, smoother impression-receiving surface, moisture retention, high plasticity, freedom from rupture on final drying, ability to prepare upwards of 30 metal printing plates per mat, etc.

This invention is further illustrated by the following specific example:

*Example*

1,800 gallons of a suspension containing 675 lbs. of bleached sulfite paper pulp and 225 lbs. sulfite AA pulp were placed in a Jones beater. A mixture of 150 lbs. of a calcium aluminum phosphate having a surface area of 220 square meters per gram and a specific gravity of 2.3–2.4 and 100 lbs. of a calcium silicate having a surface area of 95 square meters per gram was added followed by 65 lbs. of conventional additives such as locust bean gum, preservatives and the like. The resulting mixture was used to prepare stereotype mats. These mats had a density of 3.42 lbs. per 1,000 square feet per mil of thickness with a bone dry caliper of 0.0609 inch. The mats had 30.7% moisture before drying in a scorcher. After drying, the shrinkage was 28.9/32 across the grain and 19.9/32 with the grain. This shrinkage was 6% to 12% greater than that found with stereotype mats prepared in identical fashion except that 250 lbs. of calcium silicate was employed as the pigment in place of the above specified pigment combination.

Stereotype mats prepared according to the above example besides having greatly improved shrinkage properties, have excellent compression, at least comparable to stereotype mats prepared with previously known pigments.

The invention claimed is:
1. A stereotype dry mat comprising a co-felted mixture of a pigment and cellulose fibers in the ratio of from 10 to 40 parts of pigment particles per 100 parts of cellulose fibers, said pigment consisting of a mixture of from 20% to 60% of calcium aluminum phosphate and 40% to 80% of a member of the group consisting of calcium silicate, hydrous silicon oxide and a double silicate of an alkali metal and an amphoteric metal, said particles of said pigment having a surface area of at least 10 square meters.

2. A stereotype dry mat comprising a co-felted mixture of a pigment and cellulose fibers in the ratio of from 10 to 40 parts of said pigment per 100 parts of said cellulose fibers, said pigment consisting of a mixture of particles of from 40% to 80% of calcium silicate and from 20% to 60% of calcium aluminum phosphate, said pigment particles having a surface area of at least 10 square meters per gram.

3. A stereotype dry mat comprising a co-felted mixture of a pigment and cellulose fibers in the ratio of from 10 to 40 parts of said pigment particles per 100 parts of said cellulose fibers, said pigment particles consisting of 40% calcium silicate and 60% calcium aluminum phosphate, said pigment particles having a surface area of at least 10 square meters per gram.

References Cited

UNITED STATES PATENTS

| | | | |
|---|---|---|---|
| 2,222,198 | 11/1940 | Fleck | 162—181 |
| 2,739,068 | 3/1956 | Eichmeier | 162—181 |
| 2,825,645 | 3/1958 | Eichmeier et al. | 162—181 |
| 2,918,399 | 12/1959 | Eichmeier | 162—181 |
| 2,974,054 | 3/1961 | Beamesderfer et al. | 106—288 |

S. LEON BASHORE, *Primary Examiner.*